(12) United States Patent
Parks et al.

(10) Patent No.: US 9,979,240 B2
(45) Date of Patent: May 22, 2018

(54) MULTIBAND HARVESTING SYSTEMS AND METHODS INCLUDING SWITCHING NETWORKS

(71) Applicant: UNIVERSITY OF WASHINGTON, Seattle, WA (US)

(72) Inventors: Aaron N. Parks, Seattle, WA (US); Joshua R. Smith, Seattle, WA (US)

(73) Assignee: University of Washington, Seattle, WA (US)

( * ) Notice: Subject to any disclaimer, the term of this patent is extended or adjusted under 35 U.S.C. 154(b) by 231 days.

(21) Appl. No.: 15/093,459

(22) Filed: Apr. 7, 2016

(65) Prior Publication Data

US 2016/0301257 A1    Oct. 13, 2016

Related U.S. Application Data

(63) Continuation of application No. 62/144,114, filed on Apr. 7, 2015.

(51) Int. Cl.
*H02J 50/40* (2016.01)
*H02J 50/20* (2016.01)

(52) U.S. Cl.
CPC .................. *H02J 50/20* (2016.02)

(58) Field of Classification Search
None
See application file for complete search history.

(56) References Cited

U.S. PATENT DOCUMENTS

| | | | |
|---|---|---|---|
| 7,084,605 | B2 | 8/2006 | Mickle et al. |
| 8,803,363 | B2 * | 8/2014 | Veltri ........................ H02J 3/30 307/47 |
| 9,685,797 | B2 * | 6/2017 | Tofigh ................... H02J 7/0018 |
| 2008/0227478 | A1 | 9/2008 | Greene et al. |
| 2009/0117872 | A1 | 5/2009 | Jorgenson et al. |
| 2009/0273241 | A1 | 11/2009 | Gazit et al. |

OTHER PUBLICATIONS

Pavone, et al., "Design Considerations for Radio Frequency Energy Harvesting Devices", Progress in Electromagnetics Research B, vol. 45, 17 pgs., Oct. 2012.
Analog Devices, "Adg801/802 datasheet", accessed Nov. 2016, 16 pgs.
Texas Instruments, "Mixed Signal Microcontroller" (MSP430G2x53 datasheet), May 2013, 81 pgs.
(Continued)

*Primary Examiner* — Hal Kaplan
*Assistant Examiner* — Swarna N Chowdhuri
(74) *Attorney, Agent, or Firm* — Dorsey & Whitney LLP

(57) ABSTRACT

Examples described herein include systems and methods for multiband harvesting. An example system may include a single wideband antenna followed by several narrowband rectifier chains. Each rectifier chain may include a bandpass filter, a tuned impedance matching network, and a rectifier. The outputs of the rectifiers may be combined using a summation network. The summation network, which may be a diode summation network, may in some examples provide good performance even when only a subset of the narrowband harvesters (e.g. a subset of the rectifier chains) is excited.

25 Claims, 7 Drawing Sheets

(56) References Cited

OTHER PUBLICATIONS

Dickson, "On-chip high-voltage generation in mnos integrated circuits using an improved voltage multiplier technique", IEEE Journal of Solid-State Circuits, vol. 11, No. 3, pp. 374-378 (Jun. 1976).

Fano, "Theoretical limitations on the broadband matching of arbitrary impedances", Technical Report No. 41, Massachusetts Institute of Technology, Research Laboratory of Electronics, 48 pp. (Jan. 1948).

Hagerty, et al., "Recycling ambient microwave energy with broadband rectenna arrays", IEEE Transactions on Microwave Theory and Techniques, vol. 52, No. 3, pp. 1014-1024 (Mar. 2004).

Keyrouz, et al., "Multi-band simultaneous radio frequency energy harvesting", 7th European Conference on Antennas and Propagation (EuCAP), pp. 3058-3061 (Apr. 2013).

Koomey, et al., "Implications of historical trends in the electrical efficiency of computing", Annals of the History of Computing, IEEE, vol. 33, No. 3, pp. 46-54, (Jul.-Sep. 2011).

Liu, et al., "Ambient backscatter: wireless communication out of thin air", Proceedings of the ACM SIGCOMM 2013 conference on SIGCOMM, ACM SIGCOMM Computer Communication Review, vol. 43, issue 4, pp. 39-50, ACM (Oct 2013).

Niotaki, et al., "A compact dual-band rectenna using slot-loaded dual band folded dipole antenna", Antennas and Wireless Propagation Letters, IEEE, vol. 12, pp. 1634-1637 (Dec. 2013).

Parks, et al., "A wireless sensing platform utilizing ambient RF energy", Radio and Wireless Symposium (RWS), IEEE, pp. 331-333 (Jan. 2013).

Parks, et al., "Active Power Summation for Efficient Multiband RF Energy Harvesting", IEEE MTT-S International Microwave Symposium, May 2015,1-4.

Parks, et al., "Sifting through the airwaves: Efficient and scalable multiband RF harvesting", 2014 IEEE International Conference on RFID (IEEE RFID), pp. 74-81 (Apr. 2014).

Pavone, et al., "Design Considerations for Radio Frequency Energy Harvesting Devices", Progress in Electromagnetic Research B, vol. 45, Oct. 2012, 19-35.

Sample, et al., "Experimental results with two wireless power transfer systems", Radio and Wireless Symposium, IEEE, pp. 16-18 (Jan. 2009).

Sample, et al., "Wireless ambient radio power", Wirelessly Powered Sensor Networks and Computational RFID, pp. 223-234, Springer New York (Jan. 2013).

Seigneuret, et al., "Auto-tuning in passive UHF RFID tags", NEWCAS Conference (NEWCAS), 2010 8th IEEE International, pp. 181-184 (Jun.2010).

Smith, "Range scaling of wirelessly powered sensor systems", Wirelessly Powered Sensor Networks and Computational RFID, pp. 3-12, Springer New York (Jan. 2013).

Yeager, etal.,"Wirelessly-charged UHF tags for sensor data collection", IEEE International Conference on RFID, pp. 320-327, Apr. 2008.

* cited by examiner

MULTIBAND HARVESTING SYSTEMS AND METHODS INCLUDING SWITCHING NETWORKS

CROSS-REFERENCE TO RELATED APPLICATION(S)

This application claims the benefit under 35 U.S.C. § 119 of the earlier filing date of U.S. Provisional Application Ser. No. 62/144,114, filed Apr. 7, 2015, the entire contents of which are hereby incorporated by reference in their entirety for any purpose.

STATEMENT REGARDING RESEARCH & DEVELOPMENT

This invention was made with government support under CNS-1305072 awarded by the National Science Foundation. The government has certain rights in the invention.

TECHNICAL FIELD

Examples described herein relate generally to energy harvesting, and examples of wideband harvesters are described.

BACKGROUND

Harvesting ambient RF power is attractive as a means to operate microelectronics without wires, batteries, or even a dedicated RFID reader. However, previous ambient RF harvesters have been narrowband, making mobile sensing scenarios infeasible: for example, an RF harvester tuned to work in one city will not generally work in another, as the spectral environments tend to differ.

Ambient radio harvesting is a promising approach to powering battery-free sensing, computing, and communication devices. The vanishingly small amount of power now required by modern microelectronics, along with low power communication techniques, make ambient radio harvesting an increasingly viable power supply option. Compared to solar power, ambient RF has the advantage of being available at night, and is attractive from an industrial design perspective: the antennas already designed in to mobile devices for communication purposes can potentially become a power source, without requiring any changes to the form factor or appearance of the device.

However, there still exist challenges to widespread adoption of ambient RF harvesting as a power source. Conventional RF harvesting methods are only capable of extracting power from a narrow spectral band. The supply will cease to provide power when its particular source band is not available, either due to geographical fluctuations in spectral occupation, occlusion and shielding (e.g., from the walls of a building), or simply from multipath fading of the ambient signal. When starved of its energy source the device must cease to operate, limiting the application space mostly to a small geographical area with line-of-sight to an ambient radio source of interest.

Wideband harvesting may capture energy across a large swath of spectrum, but typically results in very low efficiency at any particular source frequency as the quality of the impedance match between the antenna and single rectifier reduces as the bandwidth increases. Tunable harvesting may allow a system to dynamically select a band of interest based on spectral availability, and therefore promises to be able to provide efficient rectification of signals from a single source, regardless of the frequency of that source. However, tunable harvesters in battery free systems may have difficulty bootstrapping to allow the system to coldstart, and also ignore energy outside the band to which they are tuned.

Existing multiband harvesting generally makes use of multiple antennas, each tuned to a band of interest, and each feeding an independent rectifier through a tuned matching circuit.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, signal processing elements or methods, and software operations have not been shown in detail in order to avoid unnecessarily obscuring the described embodiments of the invention.

Examples described herein include systems and methods for multiband harvesting. An example system may include as single wideband antenna followed by several narrowband rectifier chains. Each rectifier chain may include a bandpass filter, a tuned impedance matching network, and a rectifier. The outputs of the rectifiers may be combined using a summation network. The summation network, which may be a diode summation network, may in some examples provide good performance even when only a subset of the narrowband harvesters (e.g., a subset of the rectifier chains) is excited.

Figure 1:
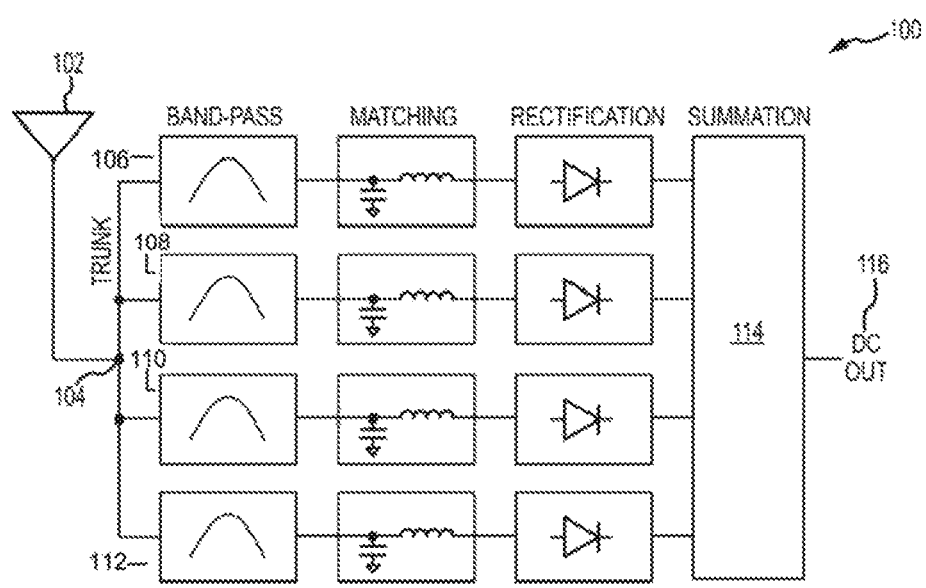
FIG. 1 is a schematic illustration of a system arranged in accordance with examples described herein.

FIG. 1 is a schematic illustration of a system 100 arranged in accordance with examples described herein. The system 100 includes an antenna 102, trunk node 104, circuitry branch 106, circuitry branch 108, circuitry branch 110, circuitry branch 112, switching network 114, and output 116. Each of the circuitry branches includes a respective bandpass filter, respective matching network, and respective rectifier. The antenna 102, which may be a wideband antenna, is coupled to the trunk node 104, which in turn is coupled to each of the circuitry branches 106-112. The circuitry branches 106-112 are coupled to the switching network 114 to sum selected outputs of the circuitry branches and provide a DC voltage at the output 116.

The antenna 102 may be a wideband antenna. Generally, the wideband antenna may receive RF signals over a frequency band which is wider than each of the frequency bands filtered by the bandpass filters in the circuitry branches in the system (e.g., circuitry branches 106-112).

Generally, a wideband antenna used to implement the antenna 102 may have approximately the same operating characteristics over the passband of the antenna 102. The antenna 102 may have a passband that includes frequency bands of interest for energy harvesting (e.g. frequency bands that may be present in an environment where energy harvesting is to be performed) including, but not limited to, cellular frequencies, TV frequencies, and Wi-Fi frequencies. Accordingly, the antenna 102 may receive wireless signals from multiple signal sources, each type of signal source generally configured to transmit wireless signals in a different frequency hand (e.g. short-range transmission. TV broadcast, Wi-Fi transmission). Any signal source may generally be used to harvest energy in accordance with examples described herein, including short-range transmitters (e.g. RFID readers), TV broadcasters, Wi-fi routers, communication devices, and combinations thereof.

Four circuitry branches are shown in FIG. 1, however any number of frequency branches may be used in other examples. In some examples, two frequency branches may be used. In some examples, three, four, five, six, seven, eight, nine, or ten frequency branches may be used. Generally, each frequency branch may include a respective bandpass filter configured to pass a particular frequency hand. The frequency hand passed by the respective bandpass filters are each generally narrower than the passband of the antenna 102. Each (in some examples, at least two) of the respective bandpass filters may be configured to pass a different frequency band. The respective bandpass filters may be orthogonally tuned. The frequency band filtered by the bandpass filter may generally be referred to by specifying its center frequency (e.g. 433 MHz, 915 MHz, 2.45 GHz, in some examples). Examples of frequency bands which may be filtered by the bandpass filters include 433 MHz, 915 MHz, 2.45 GHz in some examples. A range of 400-900 MHz in specified intervals in some examples. Generally, any number and selection of frequencies may be passed, including those in mobile communication. TV, or other bands.

Each circuitry branch further includes a matching network coupled to the bandpass filter. The matching network may be configured to provide impedance matching for the respective circuitry branch to the respective rectifier in the branch. Each matching network may have one or more resistive elements (e.g. resistors), capacitive elements (e.g. capacitors), and/or inductive elements (e.g. inductors) that provide the impedance.

Each circuitry branch further includes a respective rectifier. The rectifier is configured to receive the RF signal provided from the matching network and rectify the signal to provide a DC signal. The respective rectifiers may be implemented using respective M stage Dickson charge pumps, which may provide, rectification and voltage amplification in some examples.

Accordingly, each circuitry branch coupled to the antenna 102 (e.g. at the trunk node 104) may pass a respective frequency band to a matching network and provide the resulting signal to a rectifier. The trunk node 104 may be implemented as a port for the antenna 102. Multiple rectified signals may be provided, each from a different frequency band. Recall the different frequency bands may correspond to signals received from different environmental frequency sources (e.g., cellular, TV, Wi-Fi).

The multiple rectified signals may be combined at an output 116. In some examples, a serial combination (e.g. sum) of the rectified signals is provided, at the output 116. The output 116 may provide a DC signal (e.g., a DC voltage). The output 116 DC signal may be used to power one or more load circuits (e.g., sensors). Accordingly, the system 100 may be used to harvest energy from many different frequency bands in an environment using a single antenna in some examples.

Generally, the system 100 may have a number (N) of bandpass filters, and the respective bands may be spaced by frequency deltas ($\Delta F$), and each rectifier may have a respective number of stages.

Generally, any frequency bands may be selected for the multiband harvester system 100 of FIG. 1. For example, the system 100 may implement a multi-protocol arrangement targeting several commonly used bands. Each circuitry branch may be designed to filter a particular band. For instance, 433 MHz, 915 MHz, and 2.45 GHz could be filtered by the circuitry branches 106, 108, and 110, respectively. Other frequencies may be used in other examples. Accordingly, knowledge of commonly occupied portions of the spectrum which will be most likely to yield power may be used to select properties of the circuitry branches. This method may achieve high practical efficiency with low complexity, as the number of target bands may be relatively small.

In some examples, each bandpass filter may filter a band a set distance from the neighboring bands over a wide bandwidth (e.g. 400-900 MHz in some examples). Accordingly, any number and placement of RF signals may be efficiently harvested in some examples. Accordingly, the energy harvester may capture energy efficiently at nearly any frequency in a larger prescribed bandwidth (e.g., 400-900 MHz in some examples). By allocating circuitry branches for filtering across a complete range, design of the system 100 may not rely on knowledge of commonly occupied bands in some examples, or on current details of regulatory spectral allocation.

Examples of parallel harvester topologies, such as that shown in FIG. 1, may provide a good match to one single-port antenna (e.g. Antenna 102) at multiple bands, at least because a respective matching network may be used for each band. This is in contrast to solutions which may make use of multiple antennas, each covering a particular band of interest, or make use of dual-band antennas with multiple ports and a single rectifier. Therefore, in contrast to existing work, systems described herein may more easily scale in some examples to a large number of frequency bands with no additional antennas or antenna ports required in some examples.

The bandpass filters and matching networks used in the various circuitry branches may in some examples be tuned for desired performance. Tuning may generally refer to selecting and/or adjusting the parameters (e.g. values) of the various circuit components used m the circuitry branches, including the bandpass filters and the matching networks. In some examples, a cost function is used to optimize the design of the circuitry branches. An example cost function includes minimizing reflected energy in matching the antenna 102 to the trunk node 104 of the circuitry branches. For example, the sum of the return losses (e.g. S11) of the harvester at each frequency band should be minimized. An example cost function may additionally or instead include minimizing impact of adjacent circuitry branches on impedance of the network at each bandpass frequency of interest. For example, for each center frequency, the impedance of adjacent bands may be maximized.

In some examples, minimizing a weighted combination of the two above-described cost function factors may be used to select the bandpass filter and match network values for each band of the harvester. For example, overall S11 at each design frequency may be minimized while maximizing adjacent band impedance. For example, considering, a scenario in which only a single continuous wave is presented to the multiband harvester. If overall S11 is simply minimized, the power of this continuous wave may end up distributed over several consecutive rectifiers, resulting in several very poorly excited rectifiers and therefore may be an inefficient system. To also minimize the match quality of adjacent bands generally means that, instead of distributing this continuous wave's power, this power may be focused on one rectifier and thereby maximize or improve the efficiency of the system in harvesting that continuous wave signal. Since most ambient or intentionally radiated signals may be relatively narrow bandwidth compared to the overall scope of the system 100, most sources may excite only one of the circuitry branches of the harvester and therefore support this optimization strategy. Other optimization strategies may be used in other examples.

To perform optimization, in some examples, as lumped element model of the harvester may be developed, for example in MATLAB. The model may make use of empirical rectifier impedance measurements taken from implementations of the system 100 in some examples. Each rectifier in the multiband harvester may be characterized at each of the design frequencies (e.g. center frequencies for each of the circuitry branches) in order to achieve a more realistic model of the harvester. A simplifying model of the antenna may be used in which impedance is constant (e.g. 50Ω) across the entire hand of interest, hi some examples, the antenna impedance may be measured across the operating bandwidth and used to better tune the system 100.

Approximations for the bandpass filter matching network values for each band may be forward-computed in some examples by assuming each band is independent and selecting the values which minimize S11. The resulting values may be used as the seed values for an optimizing search based on cost functions described herein. The resulting component values would be bandpass and matching network component values which minimize overall S11 at each design frequency while minimizing interaction between adjacent bands.

Distributed modeling may be used for multiband harvesters with a large band count, which may significantly increase the complexity of modeling, and the difficulty of tuning the harvester.

In some examples, the system 100 may overcome the Bode-Fano limit, for example, by allowing the match to effectively be distributed across multiple loads. Generally, the Bode-Fano theorem describes the limits of impedance matching between a source and complex load. In conventional single-band RF harvesters or wideband harvesters, the bandwidth over which the antenna can be well matched to a single rectifier will be limited, therefore placing, an upper limit on the site of the hand over which the RF-DC conversion will remain efficient. By allowing the match to be distributed across multiple loads (e.g. multiple circuitry branches), the system 100 may in some examples overcome this limit and achieve improved efficiency over a larger band.

Note there are at least two impedance interfaces in the system 100 that may be matched to improve efficiency of RF-DC conversion. The first is the interface between the antenna 102 and the trunk node 104 of the multiband harvester. The second is the interface between the trunk node 104 and the rectifier for each of the branches. The Bode-Fano theorem may only place a limit on match bandwidth for complex sources and/or loads. It may model the limitations of the match between the trunk node 104 and the rectifier for each branch, since the rectifier impedance will generally always be complex. However, the antenna-to-trunk interface may be designed such that the impedance looking into each bandpass filter at its resonant frequency may be real and matched to the antenna. Because the adjacent branch bandpass filters may have negligible admittance at any given frequency, they may not contribute significantly to the impedance viewed from the trunk node 104 at adjacent hands. Accordingly, each circuitry branch of the system 100 may be Bode-Fano-constrained, but the antenna-to-trunk match (and therefore the system 100 as a whole) may not be so constrained.

Figure 2:
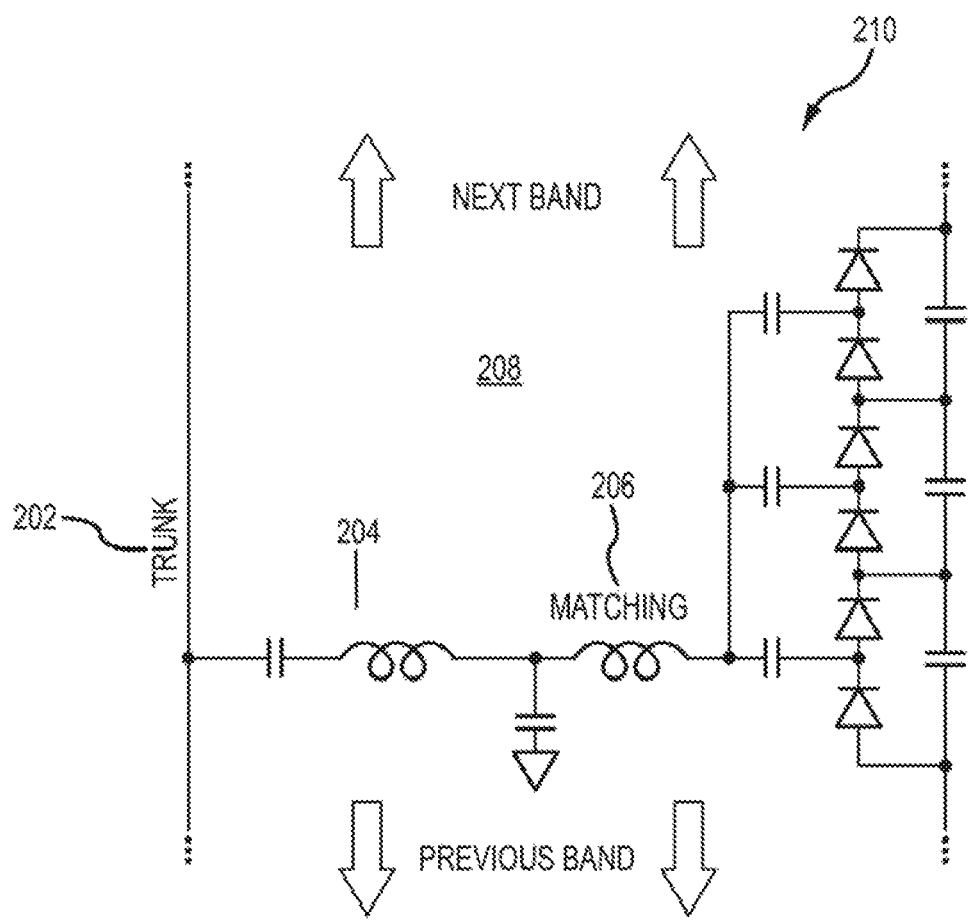
FIG. 2 is a schematic illustration of a circuitry branch arranged in accordance with examples described herein.

FIG. 2 is a schematic illustration of a circuitry branch arranged in accordance with examples described herein. The circuitry branch 208 may include trunk node 202, bandpass filter 204, matching network 206, and rectifier 210. The circuitry branch 208 may be used to implement any of the circuitry branches described herein, including any of those shown in FIG. 1, for example.

The circuitry branch 208 includes a trunk node 202, which may be coupled to an antenna, such as the antenna 102 of FIG. 1. The circuitry branch 208 may include a bandpass filter 204 coupled to the trunk node 202. The bandpass filter 204 may filter a particular frequency band, and may include one or more capacitive elements (e.g. capacitors), inductive elements (e.g. inductors), and/or resistive elements (e.g. resistors) selected to filter for the particular frequency band. As shown in FIG. 2, the bandpass filter 204 includes a capacitor in series with an inductor.

The bandpass filter 204 is coupled to a matching network 206. The matching network 206 may include one or more capacitive elements (e.g. capacitors), inductive elements (e.g. inductors), and/or resistive elements (e.g. resistors) selected to match the circuitry branch 208 to the rectifier 210. For example, the matching network 206 as shown in FIG. 2 includes a capacitor coupled between an output of the bandpass filter 204 and ground, and an inductor coupled between the output of the bandpass filter 204 and an input of the rectifier 210.

The rectifier 210 may be implemented using circuitry for rectifying and/or providing voltage amplification. As shown in FIG. 2, the rectifier 210 may be implemented using an M stage Dickson charge pump.

As described herein, for example, with reference to FIG. 1, multiple circuitry branches may be used in systems described herein, and indicated by 'next band' and 'previous band' in FIG. 2. To sum voltages provided by the rectifiers in each circuitry branch, the outputs of the rectifiers may be connected in series in some examples. In other examples, a parallel combination may be used.

Accordingly, systems described herein may use a serial connection between independent rectifiers, a topology which, in the context of multiband harvesting, may only provide high efficiency in the case where all bands (e.g. circuitry branches) are excited. If one or more bands in such a serially connected system are not excited, the diode drops in the unexcited bands' charge pumps may need to be overcome by the other bands, resulting in efficiency degradation. For example, unexcited bands' RF-DC conversion diodes may cease to be a source of voltage (e.g. produce an output voltage below a threshold, or no output voltage) at low or zero excitation power (e.g. received power below a threshold) and provide or develop a voltage drop, therefore impeding the flow of current from serially connected excited bands. Summation topologies which improve and/or overcome this effect generally allow current to divert around unexcited bands by providing a path of lesser resistance. Inactive bands accordingly may be shorted using a switching network.

It is generally difficult to produce semiconductor switches which are normally-closed when no supply voltage is present, a harvester which is capable of cold-starting (starting with all circuit nodes at zero volts) generally may not have normally-closed connections. However, when rectifiers from multiple circuitry branches, as described herein, are connected serially, normally-open switches can be used to short inactive bands and may also behave as open switches during a cold-start. Examples of switching networks described herein may accordingly include normally-open switches to facilitate cold-start of the system.

The presence of unexcited bands (e.g. circuitry branches) may commonly occur in some examples, for instance where each circuitry branch may be designed to filter and rectify RF signals from a particular type of signal source (e.g. short-range, cellular, TV, Wi-Fi). Those bands may not all always be occupied by signals in the environment. Accordingly, during operation, it may commonly occur that one or more circuitry branches of systems described herein may not be excited at any given time.

Accordingly, in some examples, a switching network may be provided (e.g. the switching network 114 of FIG. 1), to disconnect certain rectifiers from the output 116, particularly when the rectifiers are not excited, and would otherwise provide disadvantageous diode drops in a serially-connected output.

In some examples, the switching network may be implemented using "shortcut" diodes to bypass the circuitry branches which are not active, allowing an automatic optimal configuration to be achieved in summing the voltages produced by each band rectifier. These shortcut diodes my advantageously have both low threshold and low leakage in some examples, attributes which may be achievable as they will be operating at DC.

In some examples, "dead weight" diodes associated with un-excited circuitry branches may be bypassed with a single, low threshold, low leakage DC diode. Such topology may reduce any extra overhead of unexcited bands, but may still have overhead in some examples if there are many unexcited hands with many bypass diodes for current to traverse.

Figure 3:
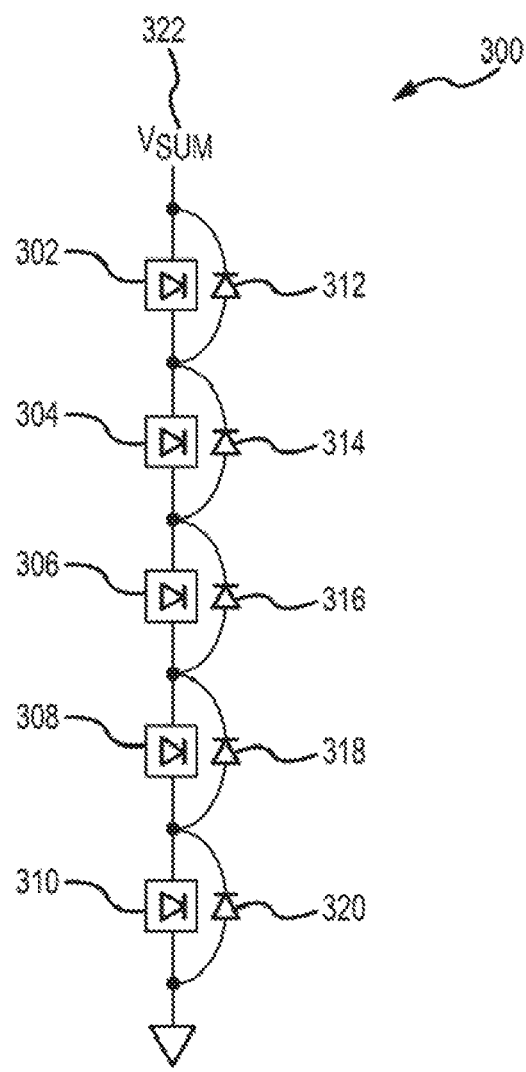
FIG. 3 is a schematic illustration of a switching network arranged in accordance with examples described herein.

FIG. 3 is a schematic illustration of a switching network arranged in accordance with examples described herein. The switching network 300 shown in FIG. 3 is for use with five serially-connected circuitry branches, but any number of circuitry branches may be used. The circuitry branches are represented in FIG. 3 by their rectifiers—rectifier 302, rectifier 304, rectifier 306, rectifier 308, and rectifier 310. The switches in the switching network 300 are implemented using diodes. Other switching elements may be used in other examples, including reversible fuses.

In the example of FIG. 3, one diode is provided for each circuitry branch to provide a bypass path for current when the rectifier is not producing sufficient voltage. Each diode is accordingly connected across one or more output diodes of the rectifier to provide a bypass path around the output diodes. For example, each diode may be connected form an output of a previous band rectifier to the output of the next band rectifier.

As shown, the diode 320 is connected between ground and an output of rectifier 310. Diode 318 is connected between an output of rectifier 310 and an output of rectifier 308. Diode 316 is connected between an output of rectifier 308 and an output of rectifier 306. Diode 314 is connected between an output of rectifier 306 and rectifier 304. Diode 312 is connected between an output of rectifier 304 and output 322, the output node of the overall system providing voltage $V_{sum}$.

When any of the rectifiers 302-310 are providing insufficient voltage to maintain the respective diode in an open state, the respective diode will provide a lower resistance current path, bypassing the output diodes of the rectifier, and avoiding presenting the diode drops associated with those output diodes to the output voltage $V_{sum}$. Other example switching networks may be able to reduce a number of bypass diodes used when multiple circuitry branches are unexcited. In FIG. 3, generally one bypass diode was used per unexcited circuitry branch.

A voltage drop associated with bypass diodes in use, may however adversely affect the output voltage $V_{sum}$.

In some examples, "shortcut" diodes may be placed between each serially-connected band output and the two output rails (e.g. the output and ground). This may reduce the efficiency hit caused by the bypass diodes i, but may not achieve optimal power combination in all cases. For instance, if the first and second bands are excited the output voltage may be near their sum (minus diode drops), but if the first and third bands are excited the output voltage may be as low as the maximum of the two band outputs, effectively throwing away the benefit of the second excited band.

Figure 4:
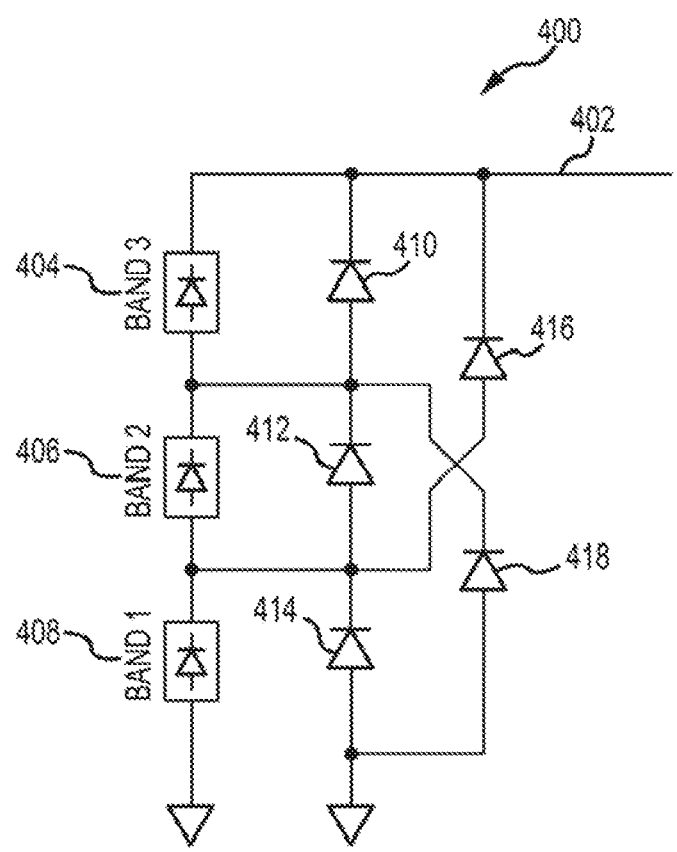
FIG. 4 is a schematic illustration of a switching network arranged in accordance with examples described herein.

FIG. 4 is a schematic illustration of as switching network arranged in accordance with examples described herein. The switching, network 400 is shown for use with three circuitry branches (e.g. bands), however in other examples switching networks may be provided for other numbers of circuitry branches, including the four circuitry branch example of FIG. 1. In FIG. 4, each circuitry branch is represented by their respective rectifier—rectifier 404, rectifier 406, and rectifier 408.

The example of FIG. 4 may allow the output 402 to attain the sum voltage of all excited bands, regardless of whether the excited bands are contiguous or scattered throughout the harvester array. As shown in FIG. 4, each node in the rectifier stack is connected to every other node with a diode, generally a properly oriented, low threshold and low leakage DC diode.

For example, the output of rectifier 408 is connected to the output of the rectifier 406 by diode 412, to output 402 by diode 416, and to ground by diode 414. The output of rectifier 406 is connected to the output 402 by diode 410 and to ground by diode 418.

If only rectifier 408 is not excited (e.g. insufficient energy has been rectified by the circuitry branch, such that voltage at an output of the rectifier is below a threshold) while rectifiers 406 and 404 are excited, the voltage at the output of the rectifier 408 may be such that diode 414 becomes a short, while the voltages at the outputs of rectifier 406 and rectifier 404 are such that the diodes 412 and 410 are open. In this manner, the output 402 may be a sum of the voltages provided by the rectifier 406 and rectifier 404, minus a voltage drop provided by the bypass diode 414. In this manner, the rectifier 408 has been disconnected from the output 402 by diode 414.

If rectifier 406 is not excited while rectifier 404 and rectifier 408 are excited, the voltage across diode 412 may cause diode 412 to short, disconnecting the rectifier 406 from the output 402. However, the voltages at the outputs of the rectifier 408 and the rectifier 404 are such that the diodes 410 and 414 are open. In this manner, the rectifier 406 has been disconnected from the output 402 and the output 402 may provide a voltage equal to the sum of the outputs of rectifier 404 and rectifier 408 less the voltage drop provided by diode 412.

If rectifier 404 is not excited while rectifier 406 and rectifier 408 are excited, the voltage across diode 410 may cause diode 410 to short, disconnecting the diode 410 from the output 402. However, the voltages at the outputs of the rectifier 406 and the rectifier 408 are such that the diodes 412 and 414 are open. In this manner, the rectifier 404 has been disconnected form the output 402 and the output 402 may provide a voltage equal to the sum of the outputs of rectifier 408 and rectifier 406, less the voltage drop provided by diode 410.

If both rectifier 408 and rectifier 406 are not excited while rectifier 404 is excited, the voltage across diode 418 may be such that diode 418 is considered a short, effectively disconnecting the rectifier 408 and the rectifier 406 from the output 402. The voltage at the output 402 may be the voltage provided by the rectifier 404 less the voltage drop of the diode 418.

If both rectifier 404 and rectifier 406 are not excited while rectifier 408 is excited, the voltage across diode 416 may be such that diode 416 is considered a short, effectively disconnecting the rectifier 404 and rectifier 406 from the output 402. The voltage at the output 402 may be the voltage provided by the rectifier 408 less the voltage drop of the diode 416.

If both rectifier 408 and rectifier 404 are not excited while rectifier 406 is excited, the voltages across diode 410 and diode 414 may be such that diode 410 and diode 414 are considered shorts, but the diode 412 is open, disconnecting the rectifier 408 and rectifier 404 from the output 402. The voltage at the output 402 may be the voltage provided by the rectifier 406 less the voltage drop of the diode 410 and diode 414.

Accordingly, the output 402 in the example of FIG. 4 may be a sum total of voltages provided by rectifiers in all excited circuitry branches, minus some number of diode drops which depends on the number and arrangement of bands excited. When multiple bands are not excited, they may be in some cases bypassed with a fewer number of diodes than the number of excited bands (e.g. one diode 418 may be used to bypass rectifier 408 and rectifier 406). In situations when all hands are excited, the matching network of FIG. 4 may perform equivalently or nearly equivalently to the approach of simple serial combination of bands. When only select bands are excited and others left unexcited, the matching network of FIG. 4 may perform more efficiently than the simple serial approach.

The leakage current of so many DC shortcut diodes may be considered when implementing a multiband harvester with a large number of bands. However, while the total number of DC shortcut diodes in the system can grow large as the number of bands increases, the leakage may not scale quite as geometrically, as the average of the reverse voltage across a diode in the system will decrease as the number of hands increases (given some number and arrangement of excited bands).

Figure 5:
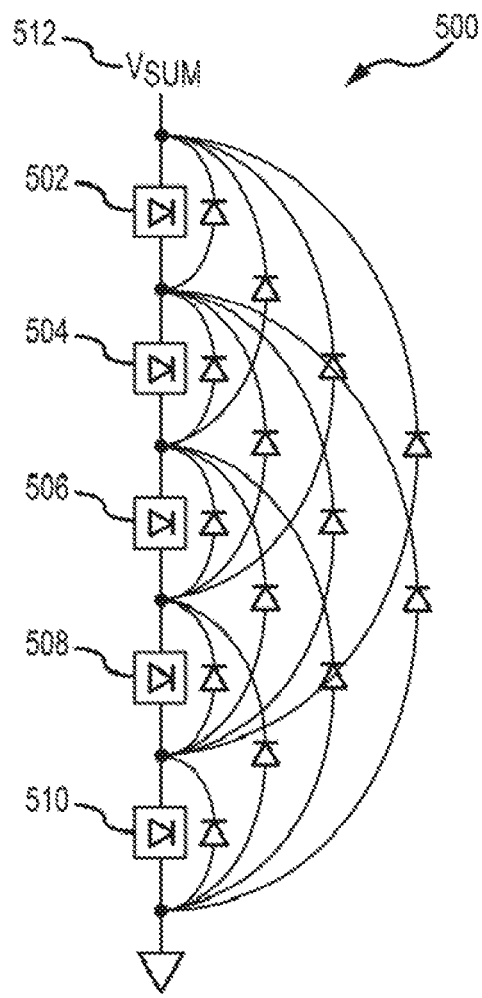
FIG. 5 is a schematic illustration of a switching network arranged in accordance with examples described herein.

FIG. 5 is a schematic illustration of a switching network arranged in accordance with examples described herein. The strategy used for the switching network 500 of FIG. 5 is similar to that used in FIG. 4, however the switching network 500 of FIG. 5 is shown with five circuitry branches—represented by rectifier 502, rectifier 504, rectifier 506, rectifier 508, and rectifier 510.

The output of each rectifier is connected to the output of every other rectifier in the serially chain with a diode. Accordingly, a total of 14 diodes are used in FIG. 5. A single diode may be used to bypass any number of neighboring rectifiers (e.g. disconnect the rectifiers from the output 512). For example, a single diode may be used to bypass rectifier 510, rectifier 508, rectifier 506, and rectifier 504 when those corresponding circuitry branches are all unexcited, and only the circuitry branch associated with rectifier 502 is excited.

Figure 6:
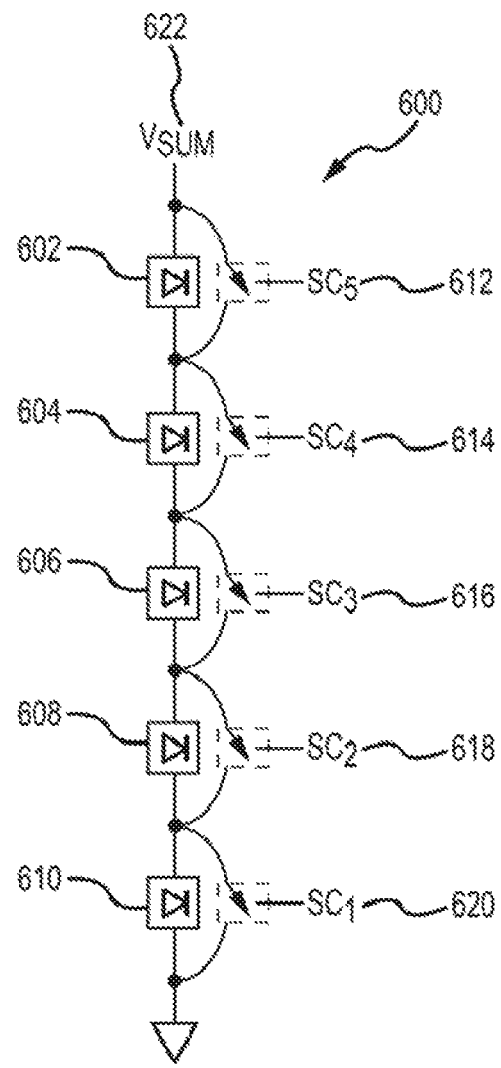
FIG. 6 is a schematic illustration of a switching network arranged in accordance with examples described herein.

FIG. 6 is a schematic illustration of a switching network arranged in accordance with examples described herein. The switching network 600 is shown for use with a system having five circuitry branches, represented in FIG. 6 by their rectifiers—rectifier 602, rectifier 604, rectifier 606, rectifier 608, and rectifier 610. In the example of FIG. 6, active switches are used to bypass un-excited circuitry branches (e.g. disconnect the rectifiers of the unexcited branches from the output).

The active switch 612 is provided to bypass rectifier 602 and is connected between the output of rectifier 604 and output 622 of the system. The active switch 614 is provided to bypass rectifier 604 and is connected between the output of rectifier 606 and the output of rectifier 604. The active switch 616 is provided, to bypass rectifier 606 and is connected between the output of rectifier 608 and the output of rectifier 606. The active switch 618 is provided to bypass rectifier 608 and is connected between the output of rectifier 610 and the output of rectifier 608. The active switch 620 is provided to bypass rectifier 610 and is connected between ground and an output of rectifier 610.

The active switches used in examples described herein may be implemented using a variety of components, including but not limited to transistors and reversible fuses.

Generally, the active switches each have a control terminal for receipt of a respective control signal, and may close responsive to receipt of an active control signal. In some examples, however, normally closed switches may additionally or instead be used.

A diode switching network may be present in some examples together with a network of active switches. For example, the switching network 500 of FIG. 5 may be connected in parallel with the switching network 600 of FIG. 6. In that manner, the diode switching network may be used during cold-start of a system—e.g. when a system is in a startup mode. During cold-start or a start-up mode, it may be undesirable or impractical to control active switches, however passive diodes may supply the bypass functionality described herein. Once startup is achieved and active control is possible (e.g. during normal operation), the bypass functionality may be performed using the active switches.

Figure 7:
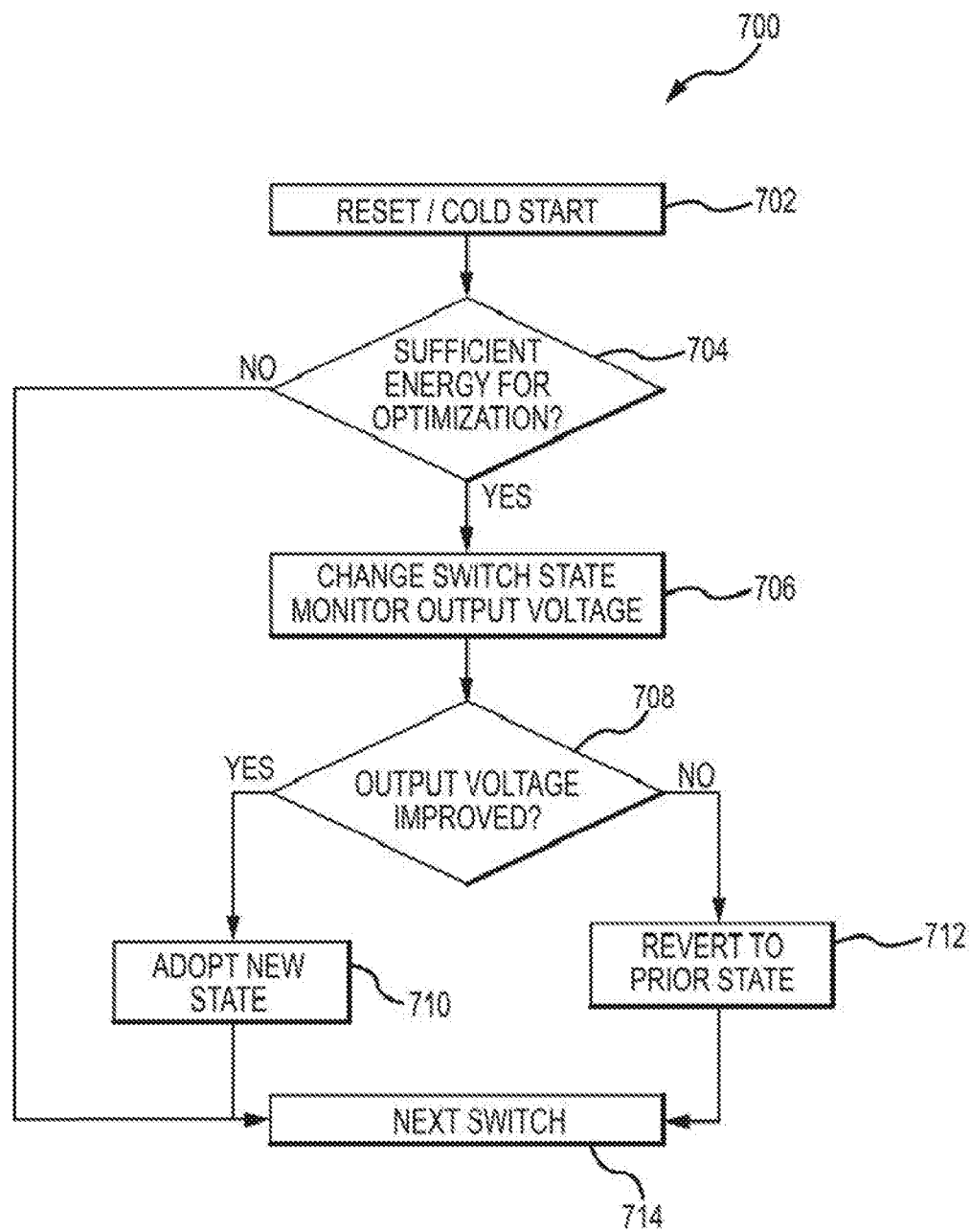
FIG. 7 is a flowchart illustrating a method for controlling a switching network with active switches arranged in accordance with examples described herein.

FIG. 7 is a flowchart illustrating to method for controlling a switching network with active switches arranged in accordance with examples described herein. The method 700 may be perforated by as controller, logic circuitry, or other computing system provided for control of switching networks including active switches described herein. The method 700 may be implemented in hardware, software, firmware, or combinations thereof.

The method 700 may begin with a reset or cold start of a system in block 702. For example, when a system (e.g. the system in any of the Figures shown herein) first receives power or first receives power after a period of time has elapsed without power, it may be in a startup mode (e.g. cold start). In some examples, where a complete or partial passive switching network is present (e.g. using diodes), the diodes may be used to bypass unexcited circuitry branches (e.g. disconnect their rectifiers from an output node).

In decision block 704, a determination is made whether the system has sufficient energy for optimization. The controller, logic circuitry, or other computing system implementing the method may monitor available energy, e.g. by monitoring an output voltage, energy stored on a capacitor, or other indicia of available energy. The energy reservoir being monitored may be connected, for example, after voltages from rectifiers in multiple circuitry branches have been summed, for example after a switching network (e.g. after switching network 114 of FIG. 1). If the available energy is above a threshold for optimization, then the method may proceed. If not, the method may end, or may move to consider a next switch in the system (e.g. Block 714).

If there is sufficient energy for optimization, a state of one active switch in the system may be changed in block 706. Following the change, the outwit voltage of the system may be monitored. Referring to FIG. 6 for example, the active switch 620 may be changed from an open to a closed state, and the output 622 may be monitored. If the output 622 improves (e.g. a greater amount of voltage is available after changing the state of the active switch 620), the new state may be adopted in block 710. If the output 622 does not improve (e.g. a same or lesser amount of voltage is available after changing the state of active switch 620), the controller logic circuitry, or other computing system performing the method 700 may revert the active switch 620 to the prior state (e.g. open).

In block 714, the method is repeated for a next switch in the system. For example, an energy check may be performed to confirm sufficient energy for optimization, the switch state may be changed and the output voltage monitored, as described in blocks 704, 706, 708, 710, and 712. These blocks may be repeated for each active switch in the switching network (e.g. each active switch shown in FIG. 6). Once all switches have been considered, in some examples, the system will repeat the process again for all switches. In this manner the state of all switches may be considered continuously during operation of the system. In some examples, once all switches have been considered, the control system may enter a sleep state and perform optimization only from time to time after the first optimization, or not until another reset or cold start in some examples.

Examples described herein may provide RF energy harvesting which may be suitable for mobile applications (e.g. to power a cell phone, other mobile computing system, and/or sensors). Example energy harvesters described, herein may be used to power ambient RF-powered data logging sensors that may, for example, upload data to RFID readers when in range.

An integrated multiband system with a single antenna port may be used as a universal RF energy harvesting solution. Systems may be able to be used in a plug-n-play fashion with a wide variety of antennas and across a wide variety of target frequencies.

Examples of systems (e.g. harvesters) described, herein may provide benefits in some examples. Example benefits are described herein to facilitate understanding. It is to be understood that not all examples may have all, or even any of the described benefits. Some example benefits may include (1) RF source flexibility (2) access to additional power and/or (3) improved sensitivity. RF source flexibility generally refers to the harvester being able to operate using any subset of several potential source frequencies. The benefit of multiband harvesting generally provides access to additional power because the harvester can collect energy from multiple RF sources simultaneously. Another benefit may be that multiband harvesting can provide improved sensitivity in circumstances in which no one source provides enough power to operate the device, but several sources in combination do.

RF source flexibility may be significant because it may enable mobile RF harvesting: the frequency of the strongest RF source may not generally be the same in each city; examples of multiband harvesters described herein may allow as device to capture power from the strongest sources it encounters in the environment. The summation networks described herein may be advantageous for RF source flexibility. A multiband harvester without the switching networks may require simultaneous excitation in all or most of its input bands. While such a harvester might provide benefits such as increased total power and increased sensitivity, it would not provide RF source flexibility. One can imagine providing RF source flexibility with an actively tunable harvester design, but the active circuitry would typically cost substantial power, resulting, in a system with low net efficiency.

The efficient multiband harvesting described, herein can enable mobile RF harvesting, increasing the practicality of ambient RF as a power source. Applied in the context of RFID, this can enable a sensor tag that uses ambient RF power to sense and to data, and then downloads the data when interrogated by an RFID reader.

Example energy harvesting systems described herein may be utilized in a backscattering transponder. Such a device may operate both as a passive RFID tag and as an ambient backscatter transponder, capable of operating from both "planted" energy sourced by an RFID reader, and with "wild" RF energy from existing signals such as those used in Wi-Fi, cellular, and TV transmissions. Such a backscattering transponder could communicate orthogonally at each of the design frequencies of the multiband harvester by performing impedance modulation separately for each band, and may be able to achieve communication diversity and multiplexing gains which could result in higher rates, longer ranges, and improved robustness.

Example energy harvesting systems described herein may be utilized in stand-alone sensor devices—e.g. Internet-of-things devices. Sensor devices that may utilize energy harvesting systems described herein include, but are not limited to, home sensors where energy harvesting systems described herein may eliminate or reduce a need to change the home sensor batteries.

Example energy harvesting systems described herein may be utilized in existing devices to provide additional functionality without depleting traditional power sources. For example, energy harvesting systems described herein may be utilized on a cell phone, tablet, laptop, or other device to provide minimum functionality when the battery is depleted (e.g. for use in locating the device and/or providing 'always on' for faster wake-up of the device, and/or maintaining state of the device).

Example harvesting systems described herein (e.g. circuitry branches and switching networks) may be implemented as a system on a chip or multiple chips in some examples). The chip may have a port for connection to an antenna (e.g. a wideband antenna). Example devices (e.g. cell phones, tablets, appliances, sensors, backscattering transponders) may include such an example chip and use it to harvest energy from the environment and power one or more functionalities of the device.

EXAMPLES

A SPICE model of a multiband harvester was constructed and subjected to some virtual experimentation. First, a single band model was constructed using Avago HSMS-285C diode models in a 3-stage Dickson charge pump arrangement. The impedance of the single band charge pump was measured at each of the design frequencies for the system. Eight bands in the region of the spectrum were selected: 300 MHz, 356 MHz, 423 MHz, 503 MHz, 597 MHz, 709 MHz, 842 MHz, and 1 GHz. A first order LC bandpass fiber was generated at each design frequency (with a Q of 5) and used to isolate the eight bands. A low-pass L-match network was then constructed for each band, to match the 50Ω source to the load impedance of each band's rectifier at its design frequency. All values were forward-computed based on initial simulated impedance measurements; no iteration was performed once initial component values had been selected.

A diode summation network was also constructed using the SPICE model for the SDM03U40 Schottky diode manufactured by Diodes. Inc., and used to stun the DC output power from each of the eight bands. The output of the summation network was connected to a 100 kΩ load resistor to simulate a device being powered.

The RF-DC Version efficiency as a function of frequency tier a single-tone excitation indicated the intended design frequencies aligned well with the conversion efficiency peaks, though there was variation in the conversion efficiency between bands.

To characterize the effectiveness of the summation network and its impact on the multiband harvester, a series of tests were done on two systems: One with the summation network in place, and one with only a simple serial connection between bands. The two systems were otherwise identical. Eight simulated voltage sources were connected serially to generate up to eight excitation tones. The eight sources were modulated in a binary-weighted fashion, turning on or off each source to ultimately produce every possible combination of excited bands (eight bands yields 256 permutations). The source power per band was set to +3 dBm for this simulation. A transient simulation was performed for each combination of excited bands, and the summed output voltage was measured after a fixed stabilization period had expired.

Power from multiple bands combined somewhat linearly, with each additional hand contributing approximately 750 µW to the sum output power on average. Note that for each permutation of excited bands, the output power may vary for two reasons: The first is that the RF-DC conversion efficiency for each band may not be equal. The second is more subtle; the diode summation network may exhibit a different operating efficiency depending on the arrangement (not simply the number) of excited bands.

This arrangement-dependent summation efficiency can be shown by comparing the case in which only bands 1, 3, and 5 are excited to the case in which only bands 1, 2, and 3 are excited. In the former case, multiple shortcut diode drops must be overcome between the excited bands, while in the latter case the bands are adjacent and therefore sum serially with no diode drop between them.

On average the summation network provided a significant benefit in terms of delivered power), though there are a number of test cases in which the presence of the summation network reduces overall efficiency. This may be attributed to the reverse leakage current of the summation diodes, which may become a significant factor with the large number of diodes required to implement the network.

A 2-band and 5-band prototype were implemented with discrete components. The prototypes use 3 stages per band and the described "shortcut" summation topology, and were connected to a wideband log-periodic antenna with a roughly 6 dBi gain when the experiment required. The two-band harvester design frequencies are 539 MHz and 915 MHz, and the fiveband harvester design frequencies are 400 MHz, 480 MHz, 590 MHz, 735 MHz, and 900 MHz. Avago HSMS-285C Schottky; diodes were used in the 3-stage RF-DC conversion charge pumps. The summation network made use of low-threshold and low-leakage SDM03U40 diodes manufactured by Diodes, Inc.

Tuning of the prototypes were accomplished by first installing the bandpass filters for every band, shorting the L-match network for every band, and measuring RF port impedance at each of the design frequencies with a test power of −10 dBm. The impedance measurements made with the shorted matching network were used to estimate matching component values. Matching was then done empirically for each and in turn, with some iteration due to the impact of each band on the consecutive bands.

During the following tests to characterize the performance of the harvester. A 100 kΩ resistive load was placed at the output of the summation network.

A. Single-Tone Response

The 2-band and 5-band prototypes were first subjected to a single-tone excitation at a power level of −10 dBm (100 µW), and the S11 (reflected power) and RF-DC conversion efficiency were measured.

During the tuning procedure, the minimization of S11 was the only goal, and this was a potential cause for the decreased efficiency observed in the 5-band harvester: In this system, S11 was not a good predictor for RFDC conversion efficiency. While the minimal S11 and maximal RF-DC efficiency points for the 2-band prototype matched well, the 5-hand harvester did not exhibit the same correlation for every band. For instance, while the fourth band's S11 showed a very good impedance match to the 50Ω source, the RFDC conversion efficiency was extremely poor compared to the other hands. The discrepancy between S11 and RF-DC, efficiency in the 5-band prototype may be due to the large amount of interaction between bands; in that prototype the quality factor of the bandpass filter was low and therefore adjacent hands may have had a strong interaction.

An experiment was performed to characterize the multiband excitation response of the 2-band prototype. The goal of this experiment was to quantify how well the harvester can combine power from multiple hands.

B. Multi-Excitation Response

The multi-excitation experiment consisted of a two-hand excitation produced by combining the output of two RF function generators. The RF-DC conversion efficiency of the entire system increased as more hands were excited.

C. In the Wild

The 5-band harvester was subjected to two scenarios in which "wild" RF energy was present. In the first scenario, it was placed in the field of a UHF RFID reader emitting 30 dBm at 915 MHz into a 6 dBic circularly polarized antenna. At a distance of 5 m from the RFID reader, the harvester was able to produce 2.3 V across a 100 kΩ load, for a delivered power of 53 µW.

In the second scenario, the 5-hand harvester was placed at a location 4.2 km distant from a TV broadcast tower emitting 1 MW at 539 MHz, and was able to produce 2.5 V across the same 100 kΩ load for a delivered power of 62.5 µW. These "wild" scenarios appeared to indicate that, despite mediocre conversion efficiency when presented with a 50Ω bench source, the antenna-connected harvester appears to work serviceably with single-band excitation from two very different ambient RF sources.

Switching Networks

Models of each of the three switching networks shown in FIGS. 3, 5, and 6 were constructed. A 5-band harvester model was used as a source in a simulation testbench. The goal of modeling was to characterize the summation benefit of each method over a naive serial combination of DC harvester outputs as a function of the excitation state of the 5-band harvester.

A SPICE model for the HSMS-282 diode used in serial summation was used as follows:

D(IS=4.8E-8, CJO=0.649E-12, VJ=5.6, BV=26.7, IBV=10E-4, EG=0.69, N=1.067, RS=7.8, XT1=2, M=0.5)

A. Test Setup: Multiexcitation Testing

Two fixed-resistance loads were used in each test scenario, 10 kΩ and 100 kΩ, and represent typical µW-scale loads that may be experienced in an energy harvesting device. A load capacitance of 10 nF was used. Two excitation power levels were used in each test scenario, −10 dBm and −20 dBm. In the multiexcitation tests, each excited band for a particular test was subjected to this excitation power and the other frequency bands were left unexcited. Every possible permutation of excited bands was tested for each data set, For each data point in each set, a transient simulation was allowed to run until a stable output voltage was reached, and the power across the load was then computed.

Low forward voltage and low reverse saturation current both must be achieved for summation network diodes to have a positive benefit. In all tests the HSMS-282 Schottky barrier diodes were used for summation as they have very low advertised forward voltage while maintaining low reverse saturation current. The parameters of the diode models used in the diode summation network are given in the SPICE model above.

In the modeled switching network including, active switches, bands left unexcited were bypassed by switches. The switch model used a 50Ω 'on' resistance and a 10 MΩ 'off' resistance, conservatively chosen values for low power analog switches such as the ADC1802 operating at low voltages. Switch power consumption for the ADG802 is under 10 nW per device. To estimate the overhead of the control logic, a TI MSP430G2553 microcontroller power consumption in low power mode (LPM3, with a crystal oscillator active) was assumed. 1. The total power consumption of switches and control logic is just under 1 µW, and all results involving intelligent switching reflect this overhead.

The diode summation network of FIG. 5 generally provided a benefit excepting the case in which all five bands were excited. The simple diode summation network of FIG. 3 also reliably provided a benefit, but in general was less beneficial over the complete test space than the full diode summation network.

The intelligent switching summation network including active switches, however, provided a strong benefit at higher input power but was less advantageous and even became an impediment as excitation power dropped. This decrease in efficacy with very low excitation power is a symptom of the power draw of the logic system for the intelligent switching network, and therefore is dependent on specific implementation.

From the foregoing it will be appreciated that although specific embodiments of the invention have been described herein for purposes of illustration, various modifications may be made without deviating from the spirit and scope of the invention.

What is claimed is:

1. A system comprising:
    a wideband antenna configured to receive wireless signals from at least a first type of signal source configured to transmit in a first frequency band, and at least a second type of signal source configured to transmit in a second frequency band, different from the first frequency band;
    a first circuitry branch including:
        a first bandpass filter configured to pass at least a portion of the first frequency band;
        a first matching network coupled to the first bandpass filter; and
        a first rectifier coupled to the first matching network;
    a second circuitry branch including:
        a second bandpass filter configured to pass at least a portion of the second frequency band;
        a second matching network coupled to the first bandpass filter; and
        a second rectifier coupled to the first matching network, wherein outputs of the first and second rectifier are configured to couple in series to an output;
    a first switch positioned to disconnect the first rectifier from the output when a voltage provided by the first rectifier is below a first threshold; and
    as second switch positioned to disconnect the second rectifier from the output when a voltage provided b the second rectifier is below a second threshold.

2. The system of claim 1 wherein the first and second switches comprise diodes.

3. The system of claim 1 wherein the first and second switches comprise active switches.

4. The system of claim 3 wherein the active switches comprise normally-open switches.

5. The system of claim 1 wherein the first and second switches comprise diodes and wherein the system further includes a first active switch positioned to disconnect the first rectifier from the output responsive to a first control signal and a second active switch positioned to disconnect the second rectifier from the output responsive to a second control signal.

6. The system of claim 5 wherein the system is configured to have the first and second diodes provide control during startup of the system, and the first active switch and the second active switch provide control during normal operation of the system.

7. A system comprising:
    a wideband antenna configured to receive wireless signals over a first frequency range;
    a plurality of circuitry branches, each of the plurality of circuitry branches including:
        a respective bandpass filter to pass a different respective frequency range, each different respective frequency range being narrower than the first frequency range; and
        a respective rectifier coupled to the respective bandpass filter, the respective rectifier configured to rectify a signal received from the respective bandpass filter;
    wherein an output of a plurality of respective rectifiers are configured to be coupled in series to an output; and
    a switching network coupled to the output and configured to disconnect selected one or ones of the plurality of respective rectifiers from the output.

8. The system of claim 7 further comprising a load circuit coupled to the output, the load circuit configured to receive power from the output.

9. The system of claim 8 wherein the load circuit comprises a backscattering transponder.

10. The system of claim 8 wherein the switching network comprises a diode network.

11. The system of claim 8 wherein the switching network comprises a network of active switches.

12. The system of claim 8 wherein the switching network comprises a diode network and a network of active switches, wherein the diode network is configured to disconnect selected one or ones of the plurality of respective rectifiers from the output during a startup mode, and wherein the network of active switches is configured to disconnect selected one or ones of the plurality of respective rectifiers from the output after the startup mode.

13. The system of claim 7 wherein component values in at least one of the plurality of circuitry branches are selected based, at least in part, on minimizing reflected energy at the wideband antenna at the respective frequency range and maximizing impedance of circuitry branches adjacent the at least one f the plurality of circuitry branches at the respective frequency range.

14. The system of claim 7 wherein an impedance looking into each respective bandpass filter is real and matched to the wideband antenna.

15. A method comprising:
receiving wireless signals at an antenna;
filtering the wireless signals into at least two frequency bands to provide at least two filtered signals;
rectifying each of the at least two filtered signals to provide respective rectified signals; and
combining selected ones of the respective rectified signals to provide an output voltage.

16. The method of claim 15 wherein said combining selected ones of the respective rectified signals comprises selecting the ones of the respective rectified signals having an amplitude greater than a threshold.

17. The method of claim 16 wherein said selecting comprises activating switches to disconnect other ones of the respective rectified signals from an output.

18. The method of claim 15, wherein the wireless signals include cellular and TV signals, and wherein the at least two frequency bands comprise a first frequency band associated with cellular signals and a second frequency band associated with TV signals.

19. The method of claim 15, wherein combining selected ones of the respective rectified signals comprises applying the respective rectified signals to a diode network.

20. The method of claim 15, wherein combining selected ones of the respective rectified signals comprises applying the respective rectified signals to a network of active switches.

21. The method of claim 20, further comprising selecting a state for each active switch in the network of active switches.

22. The method of claim 21, wherein selecting the state for each active switch comprises, for each active switch in the network of active switches:
changing as state of the active switch from an initial state to a changed state;
monitoring the output voltage after the state of the active switch changed;
selecting the changed state if the output voltage increased after the state of the active switch changed;
selecting the initial state if the output voltage decreased after the state of the active switch changed.

23. The method of claim 15, wherein combining selected ones of the respective rectified signals comprises applying the respective rectified signals to a diode network during a startup mode and applying the rectified signals to a network of active switches after the startup mode.

24. The method of claim 15, further comprising applying the output voltage to a load circuit.

25. The method of claim 24, wherein the load circuit comprises a backscattering transponder.

* * * * *